US008848995B2

(12) United States Patent
Delsanto et al.

(10) Patent No.: US 8,848,995 B2
(45) Date of Patent: Sep. 30, 2014

(54) METHOD OF CLASSIFICATION OF TAGGED MATERIAL IN A SET OF TOMOGRAPHIC IMAGES OF COLORECTAL REGION

(75) Inventors: Silvia Delsanto, Turin (IT); Lia Morra, Bra (IT); Ivan Dmitriev, Amsterdam (NL)

(73) Assignee: IM3D S.p.A., Turin (IT)

( * ) Notice: Subject to any disclaimer, the term of this patent is extended or adjusted under 35 U.S.C. 154(b) by 918 days.

(21) Appl. No.: 12/811,068

(22) PCT Filed: Dec. 28, 2007

(86) PCT No.: PCT/IT2007/000921
§ 371 (c)(1),
(2), (4) Date: Jun. 28, 2010

(87) PCT Pub. No.: WO2009/084047
PCT Pub. Date: Jul. 9, 2009

(65) Prior Publication Data
US 2010/0284593 A1 Nov. 11, 2010

(51) Int. Cl.
*G06K 9/00* (2006.01)
*G06T 7/00* (2006.01)
(52) U.S. Cl.
CPC ..... *G06T 7/0081* (2013.01); *G06T 2207/10081* (2013.01); *G06T 7/0012* (2013.01); *G06T 2207/30028* (2013.01)
USPC ...................................................... 382/130
(58) Field of Classification Search
None
See application file for complete search history.

(56) References Cited

U.S. PATENT DOCUMENTS

| 6,514,082 | B2 * | 2/2003 | Kaufman et al. | 434/262 |
| 7,148,887 | B2 * | 12/2006 | Kaufman et al. | 345/419 |
| 8,031,921 | B2 * | 10/2011 | Manduca et al. | 382/128 |
| 2007/0127804 | A1 | 6/2007 | Yoshida et al. | |

FOREIGN PATENT DOCUMENTS

| WO | 00/55814 A | 9/2000 | |
| WO | WO 00/55814 | * 9/2000 | ............ G06T 17/00 |

(Continued)

OTHER PUBLICATIONS

Summers, Franaszek, Miller, Pickhardt, Choi, Schindler, "Computer-Aided Detection of Polyps on Oral Contrast-Enhanced CT Colonography", American Journal of Roentgenology, vol. 184, Jan. 2005, pp. 105-108.*

(Continued)

*Primary Examiner* — Robert Morgan
*Assistant Examiner* — Michael Tomaszewski
(74) *Attorney, Agent, or Firm* — Sughrue Mion, PLLC

(57) ABSTRACT

A method of classification of image portions corresponding to fecal residues from a tomographic image of a colorectal region, which comprises a plurality of voxels (2) each having a predetermined intensity value and which shows at least one portion of colon (6a, 6b, 6c, 6d) comprising at least one area of tagged material (10). The area of tagged material (10) comprises at least one area of fecal residue (10a) and at least one area of tissue affected by tagging (10b). The image further comprises at least one area of air (8) which comprises an area of pure air (8a) not influenced by the fecal residues. The method comprises the operations of identifying (100), on the basis of a predetermined identification criterion based on the intensity values, above-threshold connected regions comprising connected voxels (2) and identifying, within the above-threshold connected regions, a plurality of connected regions of tagged material comprising voxels (2) representing the area of tagged material (10). The method further comprises the operation of classifying (104) each plurality of connected regions of tagged material on the basis of specific classification comparison criteria for each connected region, in such a way as to identify voxels (20) corresponding to the area of fecal residue (10a) and voxels (2) corresponding to the area of tissue affected by tagging (10b).

18 Claims, 4 Drawing Sheets

(56) References Cited

FOREIGN PATENT DOCUMENTS

WO 2007/064760 A1 6/2007
WO 2007/064980 A2 6/2007

OTHER PUBLICATIONS

Ronald M. Summers et al., "Computer-Aided Detection of Polyps on Oral Contrast-Enhanced CT Colonography", American Journal of Roentgenology, Jan. 2005, pp. 105-108, vol. 184.

J.H.Bidgoli et al., "An Efficient Colon Segmentation Method for Oral Contrast-Enhanced CT Colonography", IEEE-EMBS, Jan. 1, 2005, pp. 3429-3432, Annual International Conference of the Shanghai, China Sep. 1-4, 2005, Piscataway, NJ, USA.

Sarang Lakare et al., "3D Digital Cleansing Using Segmentation Rays", IEEE Comp. Soc., Jan. 1, 2000, pp. 37-44.

Iwo Serlie et al., "Computer Cleansing for Virtual Colonoscopy Using a Three-Material Transition Model", Lecture Notes in Computer Science, Springer Verlag, Berlin, DE., Nov. 15, 2003, pp. 175-183, vol. 2879.

\* cited by examiner

METHOD OF CLASSIFICATION OF TAGGED MATERIAL IN A SET OF TOMOGRAPHIC IMAGES OF COLORECTAL REGION

The present invention relates to a method of classification of objects and/or structures in tomographic images, in particular Computerised Axial Tomography (CAT) images.

More specifically, the invention relates to a method of digital classification of the contents of an image of a colorectal region, as defined in the preamble of claim 1.

Virtual colonoscopy is a technique which makes possible the early detection of pre-neoplastic lesions present in a colorectal region through analysis of a series of tomographic images, in particular Computerised Axial Tomography (CAT) images. Each of these images represents an axial section of the patient's abdomen and corresponds to the signal obtained from the sampled volume, which in turn depends on the absorption of X-rays by the different tissues. The diagnostic analysis of the set of images may be performed both via a study of the images themselves and by carrying out virtual navigation in the patient's organ via three-dimensional processing of the images.

In computerised axial tomography, datasets of images are generated, translating the data regarding the attenuation exerted by the tissue and by the anatomical structures on the incident X-rays into levels of intensity of grey. Since the attenuation of the faecal material subjected to X-rays is similar to that of other tissues such as, in particular, structures protruding from the colon wall and structures connected thereto, the pre-neoplastic lesions submerged in the faecal material may not be correctly identified.

In order to solve this problem, methods of classification of the faecal residues have been introduced which, by means of prior oral administration to the patient of a contrast agent, exhibit greater attenuation compared with that of the surrounding tissues, thus becoming distinguishable. In the images acquired in this way, however, the colon wall in contact with the tagged material also undergoes a spurious increase in intensity.

Various methods have been proposed for classifying and digitally removing the faecal residues. However, such methods propose approaches based on the analysis of the characteristics of the tagged faeces as a whole, proving to be not very robust in the case where the level of tagging varies along the colon, or by carrying out analyses based on the comparison of the value of each individual voxel with the values of the neighbouring voxels, with the consequent need to employ significant computing resources.

It is therefore an object of the present invention to propose a method of classification which is capable of classifying in a simple and rapid manner the faecal residues present in the dataset of images of a colorectal region, even in the presence of variations in the level of tagging of the faeces.

These and other objects are achieved by a method of classification having the characteristics defined in claim 1.

Particular embodiments are the subject of the dependent claims.

A processing system and a program for a processor as claimed form a further subject of the invention.

Other features and advantages of the invention will become clear from the following detailed description which is given purely by way of non-limiting example with reference to the appended drawings, in which.

In the following description, the method of classification according to the invention will be illustrated with reference to the particular and more usual application of a method of electronic subtraction of faecal residues.

To be considered is an image of a dataset (set of images) acquired by means of a system of computerised axial tomography exploiting the different absorption of X-rays by the tissues. As an alternative, it is possible to acquire said dataset by other tomographic techniques, such as, for example, nuclear magnetic resonance.

Figure 1:
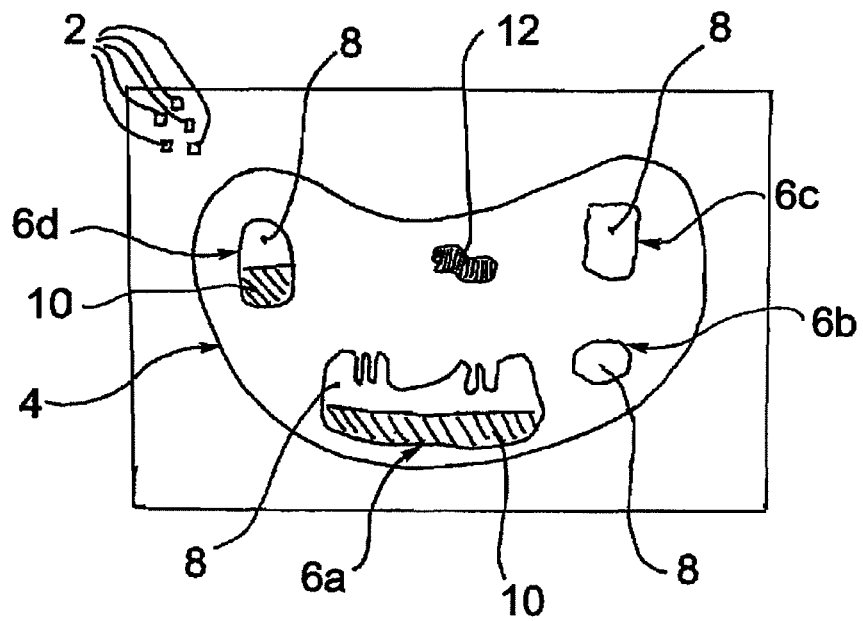
FIG. 1 is a diagrammatic representation of an image of an abdominal section.

FIG. 1 shows in a simplified form a binary image of an abdominal section comprising, in a manner known per se, a plurality of voxels, some of which have been represented as minuscule squares indicated as a whole by the reference 2. Such voxels 2 have intensity values related to the attenuation presented by the corresponding sample of the sampled volume to X-rays. The different levels of grey of the images displayed therefore correspond to the attenuation exhibited by the structures represented. The reference 4 indicates the body of the patient and the references 6a, 6b, 6c, 6d indicate a plurality of portions of the colon corresponding to different intersections of the colon with the section plane corresponding to the image. The portions of the colon 6a, 6b, 6c, 6d each comprise an area of air 8 and an area of tagged material 10 rendered detectable thanks to the presence of a contrast agent previously administered to the patient.

FIG. 1 further shows portions of bone 12 corresponding for example to the spine.

Figure 2:
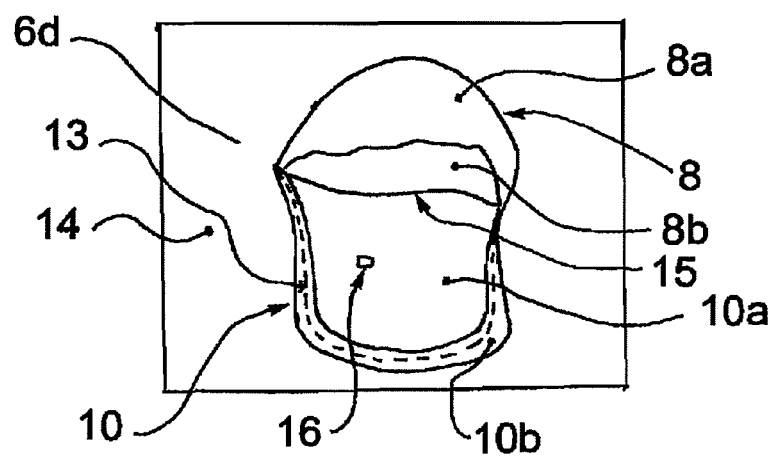
FIG. 2 is a first diagrammatic representation of a colon section.

FIG. 2 is an enlarged representation of a portion of the colon 6a, 6b, 6c, 6d, for example the portion 6d, bounded by a colon wall 13. FIG. 2 also shows tissue 14 surrounding said portion of the colon 6d and not affected by tagging, the area of air 8 and the area of tagged material 10.

The area of tagged material 10 is subdivided into an area of faecal residue 10a and an area of tissue affected by tagging 10b; the area of air 8 is subdivided into an area of pure air 8a, in which the intensity values of the voxels 2 are not influenced by the presence of the area of tagged material 10 and are preferably contained in the interval between −1024 HU and −850 HU, and an area of air affected by tagging 8b, in which the intensity values of the voxels 2 are altered by the presence of the area of tagged material 10.

As may be noted from FIG. 2, the area of tissue affected by tagging 10b comprises voxels 2 located around the colon wall 13 and influenced by the proximity of the tagged voxels 2 of the area of faecal residue 10a.

The area of tissue affected by tagging 10b is constituted by voxels 2 the intensity values of which are artificially hyperintense because of the partial volume effect due to the proximity of the voxels 2 of the area of faecal residue 10a and/or because of artefacts from hardening of the beam of X-rays.

The area of faecal residue 10a may comprise tagged faecal residue and small areas of untagged material, such as, for example, air bubbles, untagged faeces, etc.

In the following description of the method of the invention, all the operations are carried out with reference to the entire dataset of images, i.e. they are carried out three-dimensionally.

Figure 3:
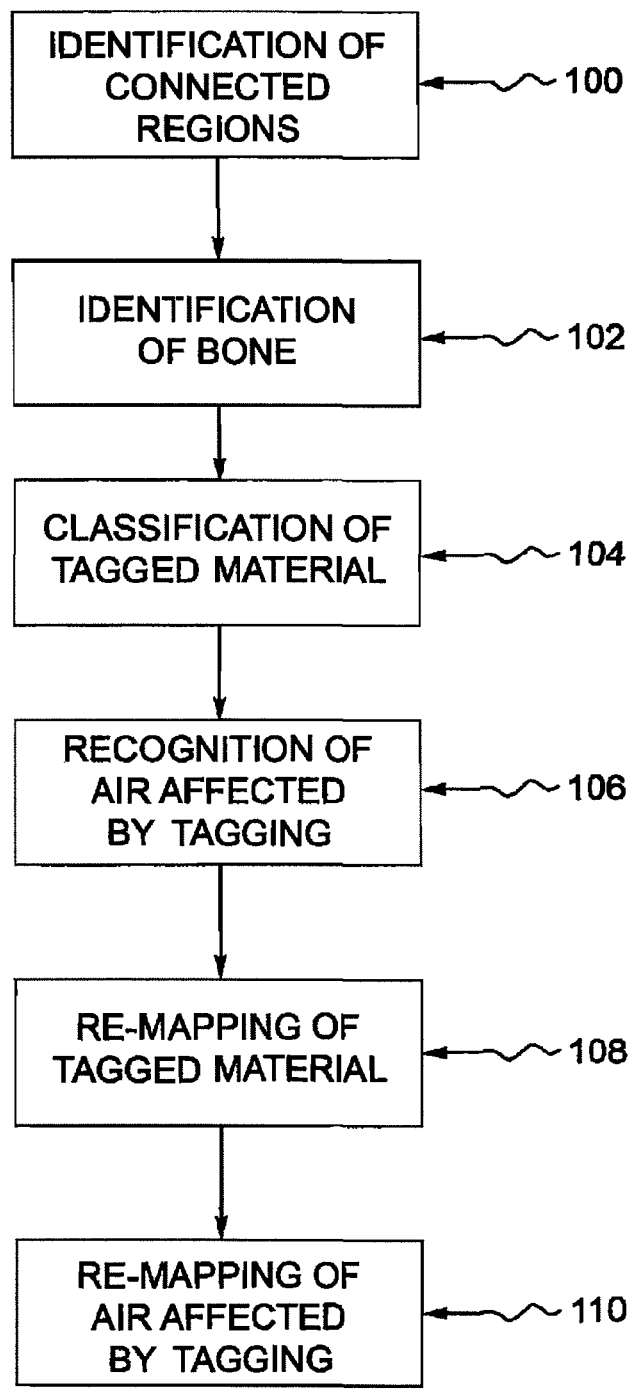
FIG. 3 is a flow diagram of the method according to the invention.

With reference to FIG. 3, the method of the invention comprises, as a first operation, the identification 100 of regions of connected voxels 2 having intensity values incompatible with the intensity values of the voxels 2 of the surrounding tissue 14, for example equal to −100 HU, or of the area of pure air 8a, for example equal to −900 HU, or of areas of air outside the colon, for example, outside the patient or inside lungs, not illustrated in the drawing.

In this operation all the voxels 2 of the areas of tagged material 10 and the voxels 2 of the portions of bone 12 are thus detected, since the bones also have a coefficient of attenuation comparable to that of the areas of tagged material 10. Initially, starting voxels 2, hereinafter termed seeds 16, are detected, on the basis of predetermined criteria. To groups of adjacent seeds 16 are annexed voxels 2 which possess specific properties, fixed a priori or derived from the properties of the group of seeds 16 to which they are annexed. Advantageously, a criterion for detection of the seeds 16 is based on an intensity threshold. In particular, a first threshold of fixed value, preferably equal to 200 HU, is established, and as seeds 16 the voxels 2 having an intensity value equal to or greater than that first threshold are selected. Then, above-threshold connected regions are generated comprising all the voxels 2 having an intensity greater than a second threshold, preferably of equal value to the first threshold.

Still in the identification step 100 described above, morphological operations are applied (such as, for example, dilations and erosions) in order to delineate the shape of said above-threshold connected regions, if necessary compensating in part the effect of the noise of acquisition of the image and artefacts due to the image itself.

These morphological operations further make it possible to add to the above-threshold connected regions also small isolated groups of below-threshold voxels 2 (representing, for example, air, particles, etc.) present in the areas of tagged material 10.

In the following step 102, among the above-threshold connected regions detected in the preceding step, connected regions of bone comprising the voxels 2 which correspond to the portions of bone 12 are identified. Step 102 comprises the application of a series of morphological operations to the above-threshold connected regions in such a way as to separate the connected regions of bone from connected regions of tagged material. Sometimes, in fact, because of the effect of partial volume and of acquisition artefacts, an individual above-threshold connected region may be constituted in part by an area of tagged material 10, comprising the voxels 2 which correspond to the tagged material itself, and by portions of bone 12 adjacent thereto.

Hereinafter, each of the connected regions is analysed on the basis of data known a priori regarding the extent, the shape and the location of the portions of bone 12. Advantageously, the characteristics of the voxels 2 belonging to the same connected regions of bone are further utilised, exploiting characteristics such as local homogeneity, standard deviation, characteristics linked to the curvature of the surface voxels 2 of the regions.

Preferably a check is made as to whether the above-threshold connected region starts in the first image of the colon and has a length along the axis Z greater than half of the images which cover the entire length of the colon, identifying it in that case as a connected region corresponding to a portion of bone 12. The presupposition is in fact that the bones are a vertically connected single structure having a sufficient length.

The connected regions of bone thus identified are not therefore used in the succeeding steps of the method described hereinafter.

In the following step 104, classification is carried out for each connected region of tagged material, between the area of faecal residue 10a and the area of tissue affected by tagging 10b.

The area of faecal residue 10a and the area of tissue affected by tagging 10b have characteristics (intensity, homogeneity, . . . ) which differentiate them in the individual connected regions of tagged material, but which cease to be discriminant as soon as the colon is considered as a whole. For example, the voxels 2 of the area of faecal residue 10a have on average an intensity value greater than that of the voxels 2 of the area of tissue affected by tagging 10b, but it may occur that areas of faecal residue 10a of a connected region of tagged material having a lesser presence of contrast agent exhibit a lower intensity value than areas of tissue affected by tagging 10b of a connected region of tagged material in which, instead, there is a greater quantity of contrast agent.

Making a distinction between voxels 2 of faecal residue 10a and voxels 2 of tissue affected by tagging 10b in each connected region of tagged material is therefore more efficacious than carrying out the classification with criteria based on the indistinct whole of all the voxels 2 of the colon corresponding to faeces and tissue affected by tagging.

Alongside this, carrying out a classification at the level of the individual connected regions of tagged material is quicker and more efficient than making a comparison between each of the voxels and its neighbours.

In order to carry out the classification 104 of the voxels of the connected regions of tagged material as stated above, n-variables are identified which characterize the tagged material 10, hereinafter termed "features". Each voxel 2 belonging to each connected region of tagged material has associated with it an n-dimensional vector containing the value of the n features for the voxel itself. Examples of these features are the intensity of the voxel, the mean intensity and the variance of the voxel and of the first neighbouring voxels, for example the first 26 voxels, and local homogeneity; likewise, the features may be constituted by parameters indicating distance from known structures/materials.

Henceforth, said vectors of variables will be termed "feature vectors". For each voxel 2 of each connected region of tagged material the feature vector associated therewith is therefore obtained. This feature vector is inputted into a classifier known per se, which establishes to which class the corresponding voxel 2 belongs, as described hereinafter.

Advantageously, the classifier provides at the output a plurality of classes representing the area of faecal residue 10a and the area of tissue affected by tagging 10b.

In this way, specific classification criteria will be available for each connected region of tagged material, inasmuch as they are obtained on the basis of the feature vectors of the voxels 2 present in the connected region itself. The classification of a voxel 2 is therefore carried out by comparing the feature vector of the voxel 2 with the data supplied by the classifier on the basis of the whole of the feature vectors belonging to the individual connected region of tagged material.

The classification criteria for each individual connected region of tagged material are derived, in particular, by inputting the feature vectors of the connected region itself into the classifier, as described hereinafter. As an alternative, such criteria are obtained both via analysis and/or modelling of the distribution of the n-variables included in the feature vector for the voxels 2 belonging to the individual connected region of tagged material, and via the combination of rules and hypotheses which combine knowledge a priori regarding the materials and the tissues present with rules drawn from analysis of the feature vectors of the individual connected region of tagged material.

An example of a classifier which operates on the basis of the feature vectors inputted distinguishes the voxels 2 belonging to the different connected regions of tagged material on the basis of a different intensity threshold for each region. In this case the feature vector is a scalar, the intensity value, and the classification criterion is an intensity threshold, different for each connected region of tagged material, determined automatically by applying, for example, the Otsu method to each connected region of tagged material.

In another case, said classifier is constituted by a neural network having a specific structure and with parameters obtained for example by "training" said neural network on each connected region.

Other examples include classifiers of the k-means and fuzzy c-means type.

An example of classification obtained via analysis and/or modelling of the distribution of the n-variables is that which is obtained by classifiers of the Bayesian type, which operate on the basis of the distribution of the parameters of the feature vectors of the voxels 2 belonging to the individual connected region of tagged material.

An example of classification obtained via the integration of a priori data regarding the probability of having predetermined types of materials, if necessary linked to the typology of the individual connected region of tagged material, is that which is obtained from classifiers of the fuzzy type which incorporate specific rules for carrying out the classification of the voxels 2 of the connected region in question.

In the following step 106, the recognition of the voxels 2 of the area of air affected by tagging 8b is performed. In order to perform said recognition 106, starting from each voxel 2 belonging to a contour 15 of the area of faecal residue 10a, for each connected region one or more paths or radii of exploration are traced, for a predetermined length of voxels, preferably 4 voxels. When a voxel 2 is encountered which has an intensity value below a predetermined value, for example equal to −700 HU, all the voxels 2 encountered previously along the ray are classified as belonging to the area of air affected by tagging 8b, interface between the air present in the lumen of the colon and the area of faecal residue 10a, termed air/liquid interface. The surface voxel 2 from which the ray has been started is also classified as belonging to the air/liquid interface. In the case where the faeces are substantially liquid, it is sufficient to trace the ray in a vertical direction, inasmuch as liquids always have a horizontal surface, so that the air-liquid interface is certainly traversed in a vertical direction if starting from the voxels 2 of the contour 15.

In the following step 108, the re-mapping of the values of the voxels 2 of the area of tagged material 10 is carried out in order to attribute to the voxels 2 of the area of faecal residue 10a intensity values compatible with those of the area of pure air 8a and to correct the intensity of the voxels 2 of the area of tissue affected by tagging 10b, eliminating the effect due to the tagging.

A first method for carrying out this correction is based on the use of the data relative to the intensity value, also altered by the tagging, which such voxels 2 of the area of tissue affected by tagging 10b exhibit. In this case, the correction can be made both by methods that are known per se and by a new method described hereinafter.

It is necessary to consider the fact that the tagging influences the intensity value of the voxels 2 of the tissue affected by tagging 10b in contact with the area of faecal residue 10a. In fact, since the voxels 2 of the area of faecal residue 10a have very high intensity values, the voxels 2 of the tissue affected by tagging 10b in contact appear artificially hyperintense. By modelling this relation it is possible to derive the values of corrected intensity to be substituted for the voxels 2 of the tissue affected by tagging 10b starting from the original intensity values of the voxels 2 affected by tagging. Various curves which specify the intensity corrected in dependence on the original intensity of a tagged voxel are known.

The voxels 2 of the area of faecal residue 10a are not modelled on the basis of such curves but are set to values compatible with the area of pure air 8a.

For example, in Lakare S., Wan M., Sato M., Kaufman A., "3D Digital Cleansing Using Segmentation Rays", IEEE Conf. Visualization 2000, 37-44, 538, the relation between the original intensity and the corrected intensity of the voxels 2 of the area of tissue affected by tagging 10b is tabulated. In another example, Nappi J. and Yoshida H., "Fully Automated Three-Dimensional Detection of Polyps in Faecal-Tagging CT Colonography", Acad. Radiol. 2007, 14(3):287-300, the values compatible with the surrounding tissue 14 are preserved while the values of the voxels 2 in the area of tissue affected by tagging 10b are obtained by modelling the relation between original voxels and voxels reconstructed by means of a straight line with negative coefficient.

Similarly, the relation may be modelled with other types of curves, such as, for example, the sigmoid.

All the methods described above make it possible to obtain a reconstruction of the colon wall 13 and a correction of the values of the voxels in the area of tissue affected by tagging 10b, but have the drawback that the curves which express the relation between the original intensity and the corrected intensity of the voxels 2 are fixed and do not take into consideration the variation that the tagging may exhibit. Variations in the level of tagging of the faeces in fact cause not only variations in the level of intensity of the voxels 2 of the area of faecal residue 10a, but also variations in the level of intensity of the areas of tissue affected by tagging 10b, so that the voxels 2 of the area of tissue affected by tagging 10b have an intensity which depends on the local concentration of the contrast agent. In cases of not very homogeneous tagging, a given intensity encountered in a voxel 2 of the area of tissue affected by tagging 10b may be interpreted both as caused by a specific proximity to the area of faecal residue 10a, and as caused by the presence of a specific concentration of the contrast agent. In these cases, the determination of the corrected intensity values to be substituted depends on the level of tagging found locally.

The method according to the invention, compatible also with the solutions characterized by fixed modelling of the relation between original and corrected intensity values of the voxels 2 of the area of tissue affected by tagging 10b, offers in addition the possibility of having a local evaluation of the intensity value corresponding to the value of the area of faecal residue 10a. This local evaluation may be made as a result of the classification carried out as described above.

In such a case, for each individual connected region of tagged material identified previously, threshold values S1 and S2 are calculated, determined locally both for the area of faecal residue 10a (threshold S1), for example by measuring the intensity values of the voxels 2 of the area of faecal residue 10a, and for the surrounding tissue 14 (threshold S2), for example by measuring the intensity values of the voxels 2 of the surrounding tissue 14 adjoining the area of tissue affected by tagging 10b. As an alternative, the intensity values of the voxels 2 of the surrounding tissue 14 may be fixed at a predetermined value, for example, −100 HU. A parametrised curve is then calculated, for example a straight line or a sigmoid, passing through the threshold values S1 and S2, and the original values of the voxels 2 of the area of faecal residue 10a and of the area of tissue affected by tagging 10b are corrected with values read from said parametrised curve.

The threshold values S1 and S2 are then calculated as a result of the presence of the connected regions of tagged material.

Alternatively, in order to obtain a more rapid procedure from the computing point of view, a single threshold value is selected for the area of faecal residue 10a, being based on information provided by a statistical summary, such as for example the mean, the mode or the median, of the whole of the intensity values of the areas of faecal residue 10a belonging to all the connected regions of tagged material.

Figure 4:
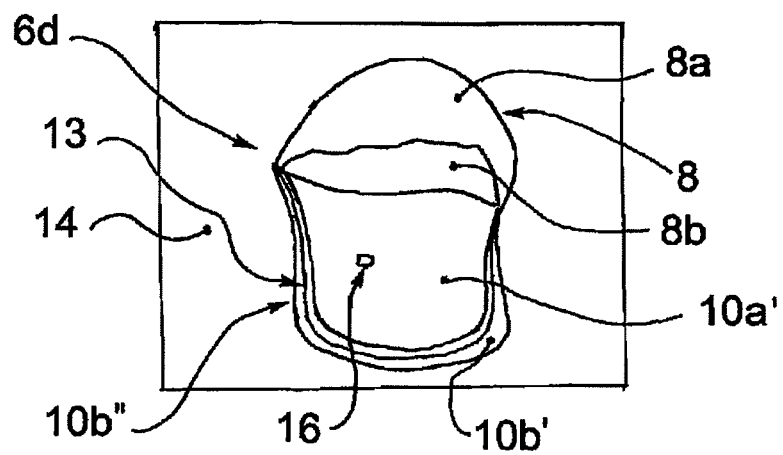
FIG. 4 is a second diagrammatic representation of the colon section of FIG. 2.

A second method for carrying out the correction of the intensity of the voxels 2 of the area of tissue affected by tagging 10b, eliminating the effect due to the tagging, comprises, as a first step, attributing to the voxels 2 of the area of faecal residue 10a a predetermined intensity value equal to that of the area of pure air 8a. In the following description, the area of faecal residue 10a will be indicated as corrected area 10a' (see FIG. 4).

The intensity values of the voxels 2 of the area of tissue affected by tagging 10b are modified in order to restore values compatible with the intensity value of the voxels 2 of the surrounding tissue 14 and of the corrected area 10a'. In order to carry out this modification correctly it is however necessary to remember that the intensity values of the voxels 2 of the area of tissue affected by tagging 10b, because of the partial volume effect derived from the proximity of the voxels 2 of the corrected area 10a', must be rendered hypointensive artificially, since the voxels 2 of surrounding tissue 14, when they are in contact with air which has a low attenuation, exhibit hypointense values. This partial volume effect, although still an artefact, must be replicated in order to reproduce the normal appearance of the mucosa of the colon.

In order to attribute the intensity values correctly to the voxels 2 of the area of tissue affected by tagging 10b, incorporating where necessary the alteration of the values caused by the presence of the voxels 2 of the corrected area 10a', in this case the data relating to the location of the voxels 2 of the area of tissue affected by tagging 10b are used and the fact that the intensity value of a voxel 2 is influenced by the value of the neighbouring voxels 2 is explicitly taken into consideration.

The voxels 2 of the area of tissue affected by tagging 10b are sub-divided into a first sub-area 10b' and into a second sub-area 10b" (see FIG. 4) on the basis of the distance from the voxels 2 of the corrected area 10a'. In particular, the voxels 2 of the area of tissue affected by tagging 10b located at a distance from the voxels 2 of the corrected area 10a' less than, for example, 4 voxels are assigned to the first sub-area 10b', and the other voxels 2 to the second sub-area 10b".

An intensity value which takes account of the partial volume effect determined by the proximity of the voxels 2 of the corrected area 10a' is assigned to the voxels 2 of the first sub-area 10b', as described hereinafter.

An intensity value compatible with the intensity value of the voxels 2 of the surrounding tissue 14, for example −100 HU, is assigned to the voxels 2 of the second sub-area 10b".

Figure 5:
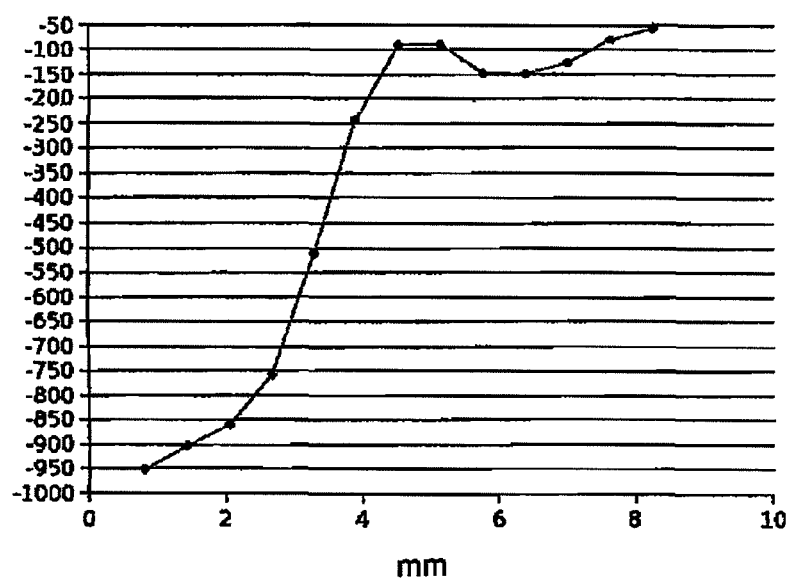
FIG. 5 is a representation of the course of the intensity between the corrected area and the colon wall.

It is known that in the transition between the corrected area 10a' and the colon wall 13 the intensity follows an increasing course, as shown in the example in FIG. 5.

In order to reconstruct the effect due to the presence of the corrected area 10a', the transition between said corrected area 10a' and the colon wall 13 is modelled and the intensity values of the voxels 2 of the first sub-area 10b' are substituted by predetermined values defined by the model, as will now be described.

A first method of reconstruction consists in substituting for the voxels 2 of the first sub-area 10b' predetermined values obtained by observation of a predetermined number, for example 50, of transition zones of this type. Advantageously, the intensity value of the voxels 2 of the first sub-area 10b' which are located at a distance of one voxel from the voxels 2 of the corrected area 10a' is set at −600 HU, the intensity value is set at −350 HU if said distance is equal to two voxels, and is set at −200 HU if said distance is three voxels.

A second method of reconstruction consists in using curves which represent how the intensity values of the voxels 2 of the first sub-area 10b' change as the distance from the corrected area 10a' increases. The parametrisation of the curves takes place on the basis of the intensity values of the voxels 2 of the corrected area 10a' and of the surrounding tissue 14 in the interface zone which is being processed. Preferably, the effect produced by the presence of the corrected area 10a' is exerted on 3 neighbouring voxels.

By using as abscissa the values for the distance of the voxels 2 from the corrected area 10a' and as ordinate the intensity values of the voxels 2 detected above, a straight line 600 is constructed (see FIG. 6), which starts from the point A(0,−900), where 0 is the distance in voxels from the corrected area 10a' and −900 HU is the intensity of the corrected area 10a', and reaches the point T(4,−100), where 4 is the distance in voxels from the corrected area 10a' and −100 HU is the intensity value of the surrounding tissue 14.

Alternatively, in order to define the intensity value of the surrounding tissue 14, all the voxels 2 close to the voxels 2 of the second sub-area 10b" are detected, excluding the voxels 2 which have intensity values compatible with the corrected area 10a', with the area of pure air 8a or with the first sub-area 10b', and the mean of the intensity values is calculated. Advantageously, this exclusion is performed by using preset thresholds, i.e. voxels 2 having intensity values below −200 HU and above 150 HU are excluded.

Figure 6:
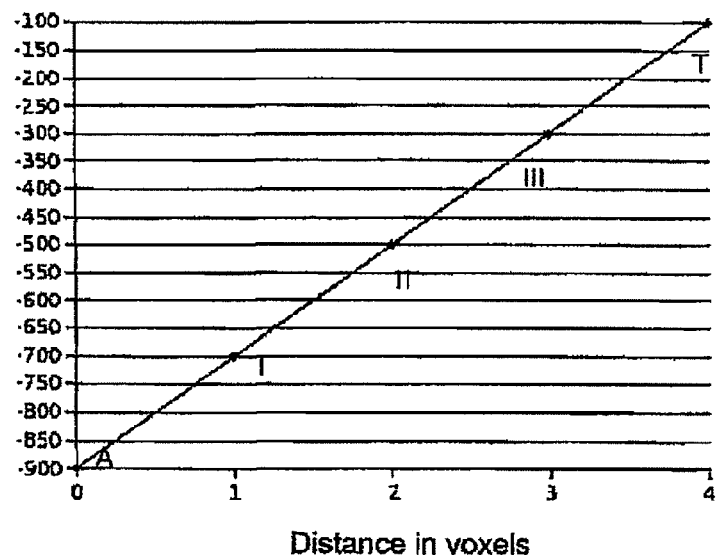
FIG. 6 is a representation of a straight line reconstruction of the values of the voxels of the area of tissue affected by tagging.

At this point, the original values of the voxels 2 of the first sub-area 10b' are corrected with values read from said straight line. In FIG. 6, the points I, II and III identify which intensity values to attribute to the voxels 2 of the first sub-area 10b' which are located respectively at a distance of one, two and three voxels from the corrected area 10a'.

This same method may likewise be applied using other curves which approximate closer to the air-tissue transition, such as, for example, the sigmoid curve.

Finally, in step 110 the correction of the values of the voxels 2 of the area of air affected by tagging 8b is carried out. A value compatible with the value of the air, preferably equal to −900 HU, is assigned to these voxels 2.

Figure 7:
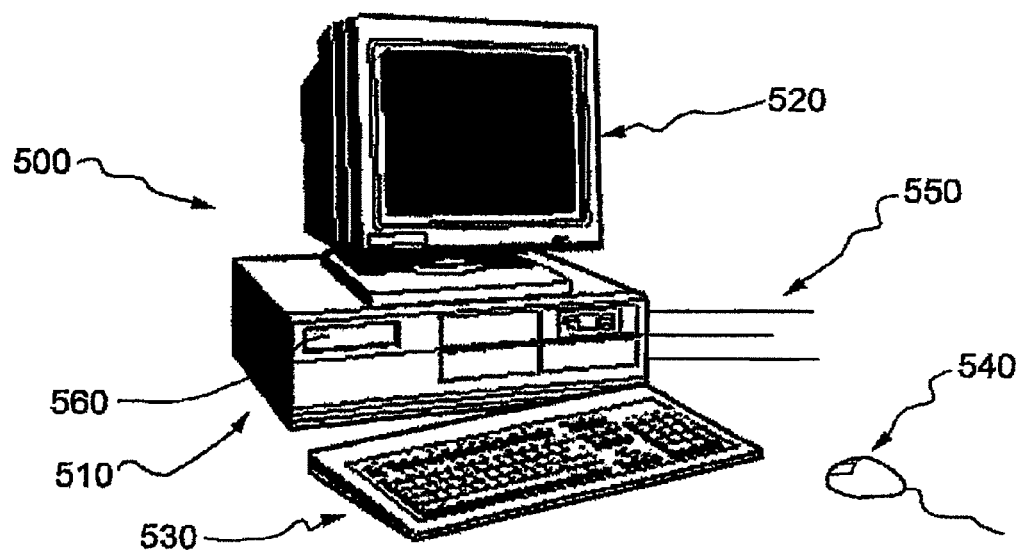
FIG. 7 is a diagrammatic representation of a processing system for the implementation of the method according to the invention.

The method according to the invention is carried out by a system of the type illustrated in FIG. 7, which comprises a computerised work station 500, of known type, having a processing sub-system 510, a display 520, a keyboard 530, a mouse 540 and a device for connection to a local network (network bus) 550. Alternatively, the processing system may be of the distributed type (not illustrated), having a processing sub-system and input/output, local or remote peripherals. The work station 500 or the distributed system are arranged for processing groups or modules of processing and calculating programs stored on disk 560 or network accessible, suitable for displaying the method described, and for displaying the results on the display 520. The solutions referred to herein are regarded as well known in the art and will not be described further herein since they are not relevant per se for the purposes of implementation and understanding of the present invention.

Naturally, the principle of the invention remaining the same, the forms of embodiment and details of construction may be varied widely with respect to those described and illustrated purely by way of non-limiting example, without thereby departing from the scope of protection of the present invention defined by the attached claims.

The invention claimed is:

1. A method of classification of portions of images of a set of images acquired by means of a system of computerized axial tomography, said portion of images corresponding to faecal residues e of a colorectal region, each image comprising a plurality of voxels (2) each having a predetermined intensity value related to the attenuation presented by the corresponding sample of the sampled volume, said image showing:
at least one portion of colon (6a, 6b, 6c, 6d) comprising:
at least one area of tagged material (10) comprising at least one area of faecal residue (10a) corresponding to tagged faecal residues present in the colon and at least one area of tissue affected by tagging (10b) corresponding to tissues of the colon located in contact with the faecal residues;
at least one area of air (8) corresponding to the air contained in the colon comprising an the area of pure air (8a) not influenced by the faecal residues;
the method comprising the operations of:
identifying (100), using a computer, on the basis of a predetermined criterion of identification based on the intensity values, first connected regions comprising connected voxels (2) having an intensity value exceeding a threshold;
identifying, using a computer, within the said first connected regions, a plurality of connected regions of tagged material comprising voxels (2) representing the area of tagged material (10);
classifying (104), using a computer, each voxel (2) of the said plurality of connected regions of tagged material on the basis of a trained classifier specific for each of said plurality of connected regions of tagged material,
said trained classifier being obtained, for each connected region, by:
identifying a plurality of variables which characterize the tagged material (10);
associating each voxel (2) with a vector containing the values of said plurality of variables;
selecting a classifier and training said classifier by providing to said classifier the values of variables of all the voxels (2) belonging to said connected region of tagged material thus obtaining a specific trained classifier; and
inputting the vectors into said specific trained classifier which identify voxels (2) corresponding to said area of faecal residue (10a) and voxels (2) corresponding to said area of tissue affected by tagging (10b).

2. The method of classification according to claim 1, wherein the operation of identifying (100) the said first connected regions of connected voxels (2) having an intensity value exceeding a threshold comprises the steps of:
selecting starting voxels (16) having an intensity value equal to or greater than a first predetermined threshold;
generating first connected regions comprising voxels (2) connected to said starting voxels (16) and having an intensity value greater than a second predetermined threshold.

3. The method of classification according to claim 1, wherein the operation of classifying (104) each voxel (2) of the said plurality of connected regions of tagged material comprises the steps of:
identifying at least one image parameter which characterizes the area of tagged material (10);
associating to each voxel (2) of each of said plurality of connected regions of tagged material a feature vector containing the value of said at least one image parameter for the given voxel (2);
processing, for each of said plurality of connected regions of tagged material and by means of automatic classification means, all the feature vectors associated to the voxels (2) belonging to each connected region of tagged material, thus obtaining a plurality of classification criteria specific for each of said plurality of connected regions of tagged material;
classifying each voxel (2) by comparing the feature vector associated to the voxel (2) with the respective specific classification criterion, in order to identify voxels (2) corresponding to the area of faecal residue (10a) and voxels (2) corresponding to the area of tissue affected by tagging (10b).

4. The method of classification according to claim 1 wherein, in the case where the image comprises also portions of bone (12), the method further comprises the operations of:
applying morphological operations to the first connected regions so as to obtain a plurality of connected regions of bone comprising voxels (2) representing the portions of bone (12);
identifying said connected regions of bone, distinguishing them from the connected regions of tagged material, on the basis of known data regarding the extent, the shape or the location of the portions of bone (12).

5. The method of classification according to claim 1, in the case where the image comprises also an area of air affected by tagging (8b) influenced method by the faecal residues, the method further comprises the operation of recognising (106), starting from each of said first connected regions, voxels (2) representing the area of air affected by tagging (8b).

6. The method of classification according to claim 5, wherein the operation of recognising (106) voxels (2) representing the area of air affected by tagging (8b) comprises the steps of
defining a contour (15) of the area of faecal residue (10a);
tracing, for each voxel (2) belonging to said contour (15), at least one path of exploration for a predetermined length until a voxel (2) having an intensity value below a preset value is reached.

7. A method of electronic subtraction of faecal residues from a tomographic image of a colorectal region, comprising the operations of:
carrying out the method of classification according to claim 1;
attributing, in each of said plurality of connected regions, to the voxels (2) corresponding to the area of faecal residue (10a), intensity values compatible with the intensity values of the voxels (2) of the area of pure air (8a);
correcting, in each of said plurality of connected regions, the intensity of the voxels (2) of the area of tissue affected by tagging (10*b*) by substituting predetermined correction values based on a predetermined model of a partial volume effect for the intensity values of said voxels (2).

8. The method of electronic subtraction according to claim 7, wherein the operation of attributing to voxels (2) corresponding to the area of faecal residue (10*a*) intensity values compatible with the intensity values of the voxels (2) of the area of pure air (8*a*) comprises the step of:

substituting for the intensity values of the voxels (2) of the area of faecal residue (10*a*) a predetermined value.

9. The method of electronic subtraction according to claim 7, wherein the operation of correcting the intensity of the voxels (2) of the area of tissue affected by tagging (10*b*) comprises the step of:

substituting for the intensity values of the voxels (2) of the area of tissue affected by tagging (10*b*) correction values obtained from a predetermined modelling curve representing said correction value as a function of the intensity values of the voxels (2) of the area of tissue affected by tagging (10*b*).

10. The method according to claim 7, wherein the operations of attributing to the voxels (2) of the area of faecal residue (10*a*) intensity values compatible with the intensity values of the voxels (2) of the area of pure air (8*a*) and of correcting the intensity of the voxels (2) of the area of tissue affected by tagging (10*b*) comprise the steps of:

a) calculating a first threshold intensity value (S1) on the basis of the intensity values of the voxels (2) of the area of faecal residue (10*a*);

b) calculating a parametrised curve passing through said first threshold value (S1), said parametrised curve representing correction values for the voxels (2) of the area of tissue affected by tagging (10*b*) as a function of the intensity values of said voxels (2);

c) substituting for the intensity values of the voxels (2) of the area of faecal residue (10*a*) and of the area of tissue affected by tagging (10*b*) correction values obtained from said parametrised curve.

11. The method of electronic subtraction according to claim 10, comprising, in the case where the image also comprises an area of tissue (14) surrounding said at least one portion of colon (6*a*, 6*b*, 6*c*), the operation of:

d) calculating a second threshold intensity value (S2) by measuring the intensity values of the voxels (2) of the area of surrounding tissue (14) adjoining the area of tissue affected by tagging (10*b*);

and wherein the step b) is substituted by the following operation:

calculating a parametrised curve passing through said first (S1) and said second (S2) threshold value, said parametrised curve representing correction values for the voxels (2) of the area of tissue affected by tagging (10*b*) as a function of the intensity values of said voxels (2).

12. The method of electronic subtraction according to claim 11, wherein the operation d) is substituted by the following operation:

substituting for the intensity values of the voxels (2) of the area of surrounding tissue (14) a predetermined value.

13. The method of electronic subtraction according to claim 7, wherein the operation of correcting the intensity of the voxels (2) of the area of tissue affected by tagging (10*b*) comprises the step of sub-dividing the voxels (2) of the area of tissue affected by tagging (10*b*) into a first sub-area (10*b*) and a second sub-area (10*b*″) in dependence on the distance from the voxels (2) of the area of faecal residue (10*a*);

substituting for the voxels (2) of the first sub-area (10*b*) first predetermined values;

substituting for the voxels (2) of the second sub-area (10*b*″) second predetermined values.

14. The method of electronic subtraction according to claim 7, wherein the operation of correcting the intensity of the voxels (2) of the area of tissue affected by tagging (10*b*) comprises the step of subdividing the voxels (2) of the area of tissue affected by tagging (10*b*) into a first sub-area (10*b*) and a second sub-area (10*b*″) in dependence on the distance from the voxels (2) of the area of faecal residue (10*a*);

calculating a parametrised curve which represents the variations in intensity of the voxels (2) of the first sub-area (10*b*') in dependence on the distance from the voxels (2) of the area of faecal residue (10*a*);

substituting for the intensity values of the voxels (2) of the first sub-area (10*b*') correction values obtained from said parametrised curve;

substituting for the voxels (2) of the second sub-area (10*b*″) second predetermined values.

15. A system of classification suitable for carrying out the method of classification as claimed in any one of claims 1.

16. A system of electronic subtraction suitable for carrying out the method of electronic subtraction as claimed in any one of claims 7.

17. A processing program or group of programs stored on disk (560) or networked and that can be carried out by a processing system of a work station (500) described in claim 15 and comprising one or more code modules for the implementation of a method of classification according to any one of claim 1.

18. A processing program or group of programs stored on disk (560) or networked and that can be carried out by a processing system of a work station (500) described in claim 16 and comprising one or more code modules for the implementation of a method of electronic subtraction according to any one of claims 7.

\* \* \* \* \*